United States Patent [19]

Jaccoud

[11] 4,080,910

[45] Mar. 28, 1978

[54] PROCESS FOR COOLING THE FLUE GASES IN WASTE MATERIAL INCINERATION PLANTS WITHOUT HEAT UTILIZATION

[75] Inventor: Pierre Jaccoud, Jona, Switzerland

[73] Assignee: Von Roll AG, Switzerland

[21] Appl. No.: 680,476

[22] Filed: Apr. 26, 1976

[30] Foreign Application Priority Data

Apr. 29, 1975 Switzerland .................. 5491/75

[51] Int. Cl.² .................. F23G 5/00; F23J 15/00
[52] U.S. Cl. .................. 110/210; 110/119
[58] Field of Search .................. 110/8 R, 8 A, 119

[56] References Cited

U.S. PATENT DOCUMENTS

| 2,906,516 | 9/1959 | Tinker | 110/8 A |
| 3,310,009 | 3/1967 | Jacobs | 110/8 A |
| 3,530,805 | 9/1970 | Bowman | 110/8 A |
| 3,680,501 | 8/1972 | Szilagyi et al. | 110/8 A |
| 3,861,334 | 1/1975 | Stockman | 110/8 A |

*Primary Examiner*—Kenneth W. Sprague
*Attorney, Agent, or Firm*—Weingarten, Maxham & Schurgin

[57] ABSTRACT

A process for cooling and raising the dew point of the flue gases in waste material incinceration plants. Secondary air and water mist are sprayed into the combustion chamber above the combustion grate. the flue gases entering the flue gas cooler are thereby preliminarily cooled. By increasing the dew point, the effectiveness of the flue gas cleaner is enhanced. Apparatus for performing the method is also disclosed.

9 Claims, 2 Drawing Figures

4,080,910

PROCESS FOR COOLING THE FLUE GASES IN WASTE MATERIAL INCINERATION PLANTS WITHOUT HEAT UTILIZATION

FIELD OF THE INVENTION

The present invention relates to waste material incineration plants where the heat generated thereby is not used for other purposes, particularly for garbage incinerators with a flue gas cooler arranged in series between the combustion chamber and a gas cleaner. More specifically, the invention relates to a process and apparatus for cooling and raising the dew point of the flue gases prior to their entering the flue gas cooler.

DISCUSSION OF THE PRIOR ART

In the known processes and apparatuses of this type, secondary air is introduced into the combustion chamber above the grate for providing the combustion gases with a turbulent motion and consequently for the subsequent burning of volatile combustible substances still contained therein within the combustion chamber. Such secondary air additionally serves for cooling the hot flue gases thereby reducing the thermal stressing of the flue gas cooler which is preferably constructed as a tubular heat exchanger mounted to the furnace. The thus cooled flue gases are then discharged to the atmosphere through the flue gas cleaner.

In the last few years there has been a progressive and considerable change in the composition of garbage. It has had a much larger percentage of dry combustible material, a fact which can mainly be attributed to the constantly increasing proportion of paper and plastic waste therein. At the same time there has been a constant rise in the calorific value of the garbage, giving readings of more than 3000 kcal/kg, with the resulting larger quantities of secondary air being required to ensure that the combustion chamber temperature does not exceed 800° to 1000° C. It has been important that the temperature in the combustion chamber not exceed the value just mentioned, that is, that it not exceed the temperature limits necessary on the one hand to prevent the melting of the fly ash which would otherwise occur and on the other hand for the deodorization of the evil-smelling flue gases. Due to the change in the garbage composition, whereby industrial waste is at times added to the garbage, the dew point of the flue gases has often been found to have dropped to 30° C and below.

Because of the higher volume of secondary air required for cooling resulting from the increased calorific value of the garbage, the effective flue gas volume has been increased, leading to the necessity of correspondingly larger gas coolers and gas cleaners. This in turn leads not only to an undesired increase in the structural dimensions of these devices but more particularly to an increase in the plant and operating costs. Such cost increases represent an important disadvantage particularly in the case of the gas cleaners which are generally constructed as electrostatic precipitators and which, by their nature, always have a high cost price. Furthermore, the reduction of the flue gas dew point to below 30° C causes a greatly reduced separating efficiency of electrostatic precipitators.

It has also been found, for example, that with the change of the garbage composition and the interlink change of the flue gas characteristics, the flue gas cooler tubes, through which the flue gases flow and upon which air as the cooling medium acts in transverse manner, rapidly become very dirty at flue gas temperatures of 800° to 1000° C and are more difficult to clean.

Thus, the desired long uninterrupted operating periods of about 2000 operating hours in garbage incineration plants can no longer be achieved due to the above-mentioned changes in garbage composition.

SUMMARY OF THE INVENTION

The invention serves to eliminate the above-mentioned disadvantages.

The invention is a process of the type indicated hereinbefore according to which a regulatable quantity of water is sprayed into the combustion chamber in uniform distribution together with the secondary air so that, following oxidation of the combustible volatile constituents, the flue gases in the combustion chamber are precooled and simultaneously their dew point is raised. The invention also is concerned with an apparatus for performing this process, having at least one mixing nozzle for the secondary air and the water arranged in the furnace wall bounding the combustion chamber above the combustion grate.

BRIEF DESCRIPTION OF THE DRAWINGS

The objects, features and advantages of the present invention will be apparent from the following description when read in conjunction with the accompanying drawing in which.

DESCRIPTION OF THE PREFERRED EMBODIMENTS

Figure 1:
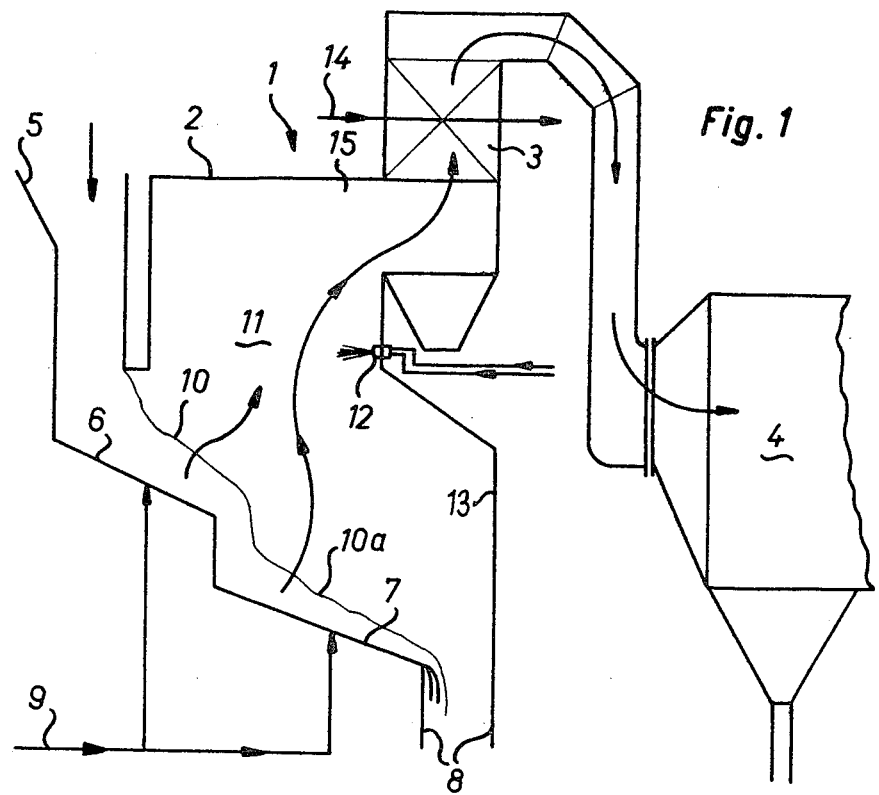
FIG. 1 is a schematic vertical longitudinal section through a garbage incineration plant constructed in accordance with this invention.

In FIG. 1 the garbage incineration plant 1 substantially comprises a garbage combustion furnace 2, a flue gas cooler 3 mounted on the furnace and a flue gas cleaner 4 connected in series therewith. The garbage to be burned is supplied to furnace 2 via a charging hopper 5. The garbage is initially moved over a grate area 6 serving for the preliminary drying, heating and ignition thereof and is subsequently moved over the main combustion grate 7 for final incineration. Thereafter the combustion residues fall into an ash pit 8, from where they are removed. Primary air, which is used as combustion air for burning the garbage, is supplied to furnace 2 via a pipe 9. Part of this air is conveyed beneath grate 6, being blown therethrough and through the garbage layer 10 located thereupon, thus serving to dry the garbage as well as providing for its ignition. The remaining portion of the primary air is blown through the main combustion grate 7 and through the garbage layer 10a located thereon and on into combustion chamber 11.

A mixing nozzle 12 for the secondary air and water, constructed as a two-substance nozzle is located above the combustion grate 7 in the rear wall 13 of the furnace which rearwardly bounds the combustion chamber. An exemplified construction of the mixing nozzle 12 is shown schematically in FIG. 2. While only one such nozzle is shown and described herein, it is possible to install a plurality of such nozzles in an incinerator for optimization of the desired conditions. In order to prevent the flue gas temperature in combustion chamber 11 from rising above the permitted maximum temperature, and so that the increase in flue gas volume is minimized, the water is sprayed in finely distributed form with the aid of the secondary air via the mixing nozzle 12. This is accomplished in such a way that on the one hand there is a sufficient excess of oxygen as needed for the subsequent burning mentioned previously, and at the same time the average flue gas temperature is maintained at the reduced level of between 650° and 700° C at the uper outlet end of combustion chamber 11.

The residence time of the water sprayed into combustion chamber 11 in the form of fine droplets is selected in such a way that its evaporation is ensured in a completely satisfactory manner and homogeneous cooling of the flue gases is achieved, so that an optionally necessary afteroxidation of any combustible constituents still present in the flue gases is ensured. This residence time amounts, for example, to about 2 seconds. Furthermore, with a maximum uniform distribution of the water droplets, the flue gas residence time in the combustion chamber 11 is selected in such a way that neither local undercooling nor overheating can occur therein. Due to the spraying in of water, the water dew point of the flue gases is raised to at least 45° C while at the same time its temperature is reduced to 650° to 700° C. Thus the sprayed-in air significantly contributes to flue gas cooling and at the same time produces a desired effect upon the dew point of the flue gases.

The spraying in of secondary air plus water, e.g. 0.2 to 0.3kg of water/Nm$^3$ of secondary air by means of mixing nozzle 12 only relatively slightly increases the waste gas volume so that both flue gas cooler 3 and flue gas cleaner 4 connected in series therewith may be operated under optimum conditions. The flue gas tube in cooler 3 are cooled by air 14 passing thereround as it flows through the cooler. Cleaner 4 is a conventional electrostatic precipitator which operates less efficiently as the dew point of the gases to be cleaned is reduced. It has also been found that under the above-described conditions of the present invention, the flue gas cooler 3 becomes dirty much more slowly and even then can be cleaned much more easily than is true with prior art systems. The flue gas cooler 3 is chosen in such a way that it reduces the temperature of the precooled flue gases to between 250° and 300° C, temperatures which are optimum for electrostatic precipitators.

Figure 2:
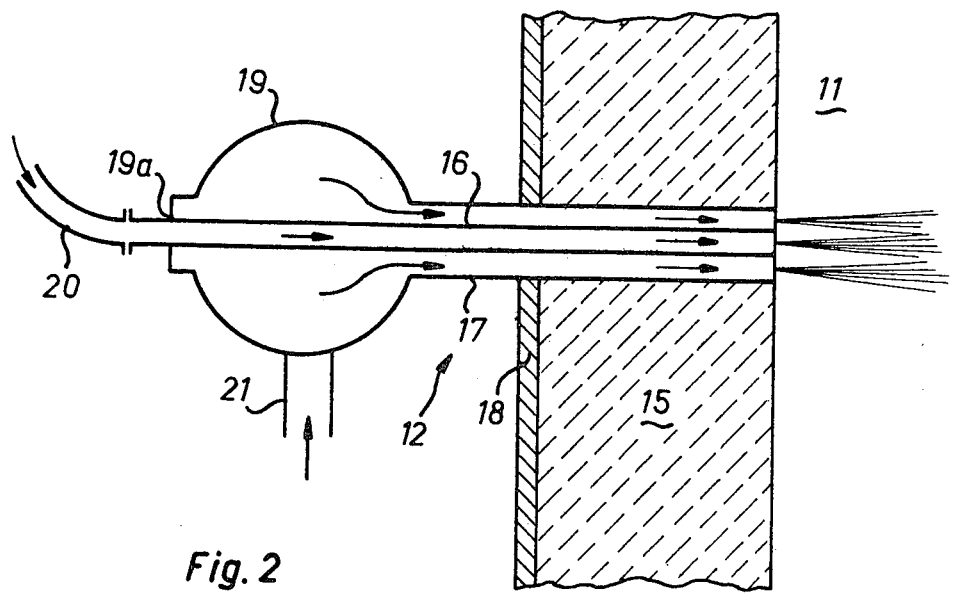
FIG. 2 is a partial longitudinal section of a mixing nozzle for air and water for practicing the invention.

FIG. 2 schematically shows a longitudinal section through a mixing nozzle 12. A tubular water jet 16 is located within an also tubular secondary air jet 17, coaxial to the longitudinal central axis of the latter. The secondary air jet 17 passes through furnace wall 15 and furnace plate 18 provided externally on the furnace wall. The secondary air jet 17 is connected to a tubular air distributor 19. The jet tube 16 for the water passes through the air distributor 19 at point 19a and is provided with an outer connection 20 to a water source (not shown). An intake 21 for the secondary air connection is provided on the terminal portion of air distributor 19. A plurality of mixing nozzles 12 are distributed over the length of air distributor 19 and issue into combustion chamber 11.

The water connection 20 and air intake 21 are each provided with an independently adjustable regulating member, not shown in FIG. 2, so that the air and water quantities supplied can be regulated independently of one another. It is also possible to jointly regulate the air and water volumes necessary from a central regulating means in accordance with the operating conditions in the combustion furnace 2 by suitable well known means. Furthermore, the secondary air and water supply could be automatically regulated in a closed circuit, also by known means, as a function of predetermined rated oulet values for the average flue gas temperature (e.g. 650° C) and the water dew point of the flue gases (e.g. 45° C), both temperatures being measured within the combustion chamber 11 in the vicinity of the outlet point for the flue gases.

An advantage of the described apparatus and process for flue gas cooling in waste material and more particularly in garbage incineration plants which do not utilize the heat generated therein, is that now, due to the water injection performed together with and by means of the secondary air, the effective waste gas volume supplied to the flue gas cooler and the series-connected gas cleaner is much smaller than hitherto. An advantageous result is that both the flue gas cooler and gas cleaner, while still meeting the stringent legal waste gas requirements, can be operated in optimum manner in conjunction with the present invention. The present process and apparatus has the further advantage that due to the conditioning of the flue gases performed in front of the electrostatic precipitator by increasing the water dew point, the ionizability of the flue gases is considerably improved, leading to a corresponding increase in the separating efficiency of the electrostatic precipitator. A further important advantage is that the flue gas cooler tubes through which flow the precooled flue gases now become dirty at a significantly slower speed so that they only have to be cleaned at rare intervals, and this cleaning operation is also easy to perform. As tests are performed, it is now possible to obtain 2000 hour operating cycles and even higher for a garbage incineration plant in which the present invention is employed.

As a result of an appropriate choice of the spraying cone angle and in view of the relatively short paths of the individual water droplets in the combustion chamber because of the short evaporation paths achieved due to their minimum size on the one hand and due to the intense heat transfer on the other, a local cooling of the brickwork bounding the combustion chamber due to water droplets striking the hot furnace walls can be prevented. There is thus no possibility of any destruction of the brickword due to abrupt temperature changes, wetting and/or acid corrosion. Such acid corrosion could occur as a result of condensation on reaching the sulphuric acid dew point of the flue gases if droplets were permitted to reach the wall. Furthermore, as the water is atomised into ultra-fine droplets, there is an optimum uniform temperature gradient over the entire combustion chamber cross-section, leading to a correspondingly increased thermal efficiency of the garbage incineration plant. The water jets have excellent protection from heat and dirt by the secondary air jet surrounding the same in jacket-like manner. This is because the still cold water ensures a good cooling of the water jet tube and the secondary air flowing at high speed through the air jet tube prevents any deposition of dirt from the combustion chamber from occurring on the end of the water jet. In this way the entire end of the mixing nozzle, including both the air jet and the water jet, is protected from dirt. As a result, the mixing nozzle always fully retains its blowing and atomisation characteristics.

A further advantage of this precooling process and the apparatus for performing the same, is that the cooling apparatus, together with associated control and regulating equipment, can also be subsequently incorporated into an existing combustion furnace. With such a modification a waste material incineration plant which has become inadequate relative to the flue gas precooling can be converted to the new, much more advantageous cooling system of this invention.

The invention is not limited to the embodiments described and represented hereinbefore and various modifications can be made thereto by those skilled in the art which are within the scope of the invention.

What is claimed is:

1. An apparatus for cooling the flue gases in waste material incinerating plants having a combustion chamber, a flue gas cooler and a gas cleaner connected in series, said apparatus comprising:
   a source of secondary air;
   a source of water;
   mixing nozzle means for combining said water and said secondary air and spraying them into said combustion chamber above the incinerating material before said flue gas cooler;
   said mixing nozzle means comprising:
   a jet tube for the secondary air and a jet tube for the water, means for axially displacing said jet tube for the water within said jet tube for the secondary air, wherein the distance between the end of the water jet relative to the end of the air jet is adjustable;
   whereby oxidation of the combustible, volatile constituents in said flue gases occur, said gases are precooled and their dew point is raised.

2. An apparatus for conditioning flue gases by cooling, raising the dew point thereof and providing secondary combustion air in waste material incinerating plants without heat utilization having a combustion chamber, a flue gas cooler and a gas cleaner connected in series, said apparatus comprising:
   a source of secondary combustion air;
   a source of water;
   means for spraying said water into said combustion chamber intermediate said incinerating material and said flue gas cooler; and
   means for injecting said secondary combustion air into said combustion chamber intermediate said incinerating material and said flue gas cooler, said air injecting means and said water spraying means comprising a mixing nozzle to cause mixture and atomization of said water only inside said combustion chamber.

3. The apparatus according to claim 2 wherein said water spraying means comprises a jet tube, wherein said air injecting means comprises a jet tube and wherein said water jet tube is coaxially disposed in said air jet tube.

4. The apparatus according to claim 2 and further comprising a joint air distributor connected to said air injecting means.

5. A process for cooling the flue gases in waste material incinerating plants having a combustion chamber, a flue gas cooler and a gas cleaner connected in series, said process comprising the steps of:
   simultaneously introducing secondary air and water into said combustion chamber intermediate said incinerating material and said flue gas cooler;
   maintaining said secondary air and said water in a separate, unmixed condition prior to the introduction of said air and water into said combustion chamber;
   atomizing said water by means of said secondary air thereby mixing said air and water within said combustion chamber;
   oxidizing the combustible, volatile constituents in said flue gases;
   cooling said gases to at least 650° C by the secondary air and water before said flue gases are passed from said combustion chamber into said flue gas cooler;
   simultaneously raising the water dew point of the flue gases by means of said atomized water in said combustion chamber; and
   regulating the respective quantities of said secondary air and water introduced into said combustion chamber as a function of the rated values for the average flue gas temperature in the combustion chamber and the water dew point of the flue gases 6. A process for conditioning flue gases by cooling, raising the dew point thereof and providing secondary combustion air in waste material incinerating plants without heat utilization, said plants having a combustion chamber, a gas cleaner and a flue gas cooler connected intermediate said combustion chamber and gas cleaner, said process comprising the steps of:
   simultaneously introducing secondary combustion air and water into said combustion chamber by means of a mixing nozzle located intermediate said incinerating material and said flue gas cooler to provide atomization of said water and mixture of said air and water together with said flue gases; and
   maintaining said secondary combustion air and said water in a separate, unmixed condition prior to the introduction of said air and water into said combustion chamber;
   whereby oxidation of the combustible, volatile constituents in said flue gases occurs due to the introduction of said secondary air, said gases are precooled due to the introduction of said secondary combustion air and said water and the dew point of said gases in raised due to the introduction of said water.

7. The process according to claim 6, wherein said flue gases are cooled to at least 650° C by the secondary air and water before they are passed from said combustion chamber into said flue gas cooler.

8. The process according to claim 6, wherein the secondary air and water quantities to be introduced into the combustion chamber are manually or automatically regulated as a function of the rated values for the average flue gas temperature in the combustion chamber and the water dew point of the flue gases.

9. The process according to claim 6, wherein the secondary air and water quantities to be introduced into the combustion chamber are divided up prior to entering the combustion chamber and are introduced into the combustion chamber at several points, in each case in an at least approximately identical air water ratio.

* * * * *